US010897351B1

(12) United States Patent
Kirchhof et al.

(10) Patent No.: US 10,897,351 B1
(45) Date of Patent: Jan. 19, 2021

(54) ENCRYPTION KEY MANAGEMENT FOR AN AUTOMATED WORKFLOW

(71) Applicant: Slack Technologies, Inc., San Francisco, CA (US)

(72) Inventors: Angela Kirchhof, Denver, CO (US); Curtis Neil Allen, Jr., Denver, CO (US); Dustin James Lindquist, Denver, CO (US); Samuel Opoku-Agyemang, Denver, CO (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/920,053

(22) Filed: Jul. 2, 2020

(51) Int. Cl.
*H04L 29/06* (2006.01)
*H04L 9/08* (2006.01)
*G06F 21/60* (2013.01)

(52) U.S. Cl.
CPC .......... *H04L 9/0822* (2013.01); *G06F 21/602* (2013.01); *H04L 9/0894* (2013.01); *H04L 63/0428* (2013.01)

(58) Field of Classification Search
CPC . H04L 9/0822; H04L 9/0894; H04L 63/0428; G06F 21/602
See application file for complete search history.

(56) References Cited

U.S. PATENT DOCUMENTS

| | | | | |
|---|---|---|---|---|
| 6,718,361 B1 * | 4/2004 | Basani | ................ | H04L 67/1095 707/999.01 |
| 7,178,021 B1 * | 2/2007 | Hanna | ................ | G06F 21/6209 713/150 |
| 7,546,465 B2 | 6/2009 | Kent, Jr. et al. | | |
| 9,100,355 B2 | 8/2015 | Tomkow | | |
| 9,380,523 B1 | 6/2016 | Mijar et al. | | |
| 9,940,394 B1 | 4/2018 | Grant et al. | | |
| 2005/0094814 A1 * | 5/2005 | Aihara | ................ | H04L 63/068 380/247 |

(Continued)

FOREIGN PATENT DOCUMENTS

WO 2014204862 A1 12/2014
WO 2017040334 A1 3/2017

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Vance M Little
(74) *Attorney, Agent, or Firm* — Erise IP, P.A.

(57) ABSTRACT

Media, system, and method for providing encryption key management to an automated workflow within a group-based communication system. The automated workflow is encrypted using an organization-specific encryption key and is stored in a data store. Responsive to a triggering event, the encrypted workflow is retrieved from the data store to be decrypted and a corresponding decryption key is retrieved from a key store. The decrypted workflow performs a series of steps responsive to determining that a trigger condition has been met. The steps may be associated with at least one of sending a form and sending a message to a user within the group-based communication system.

19 Claims, 8 Drawing Sheets

(56) References Cited

U.S. PATENT DOCUMENTS

| | | | |
|---|---|---|---|
| 2010/0287377 A1* | 11/2010 | Lim | H04L 9/3247 713/176 |
| 2011/0137548 A1* | 6/2011 | Shen | G06F 3/017 701/533 |
| 2012/0173969 A1* | 7/2012 | Schmid | G06F 40/186 715/246 |
| 2013/0018927 A1* | 1/2013 | Chang | G06F 12/1408 707/805 |
| 2014/0164776 A1* | 6/2014 | Hook | G06F 21/6218 713/171 |
| 2014/0289518 A1* | 9/2014 | Sinha | G06F 21/6263 713/165 |
| 2015/0058629 A1* | 2/2015 | Yarvis | H04L 63/0442 713/171 |
| 2015/0127937 A1* | 5/2015 | Ali | H04L 63/101 713/165 |
| 2015/0312233 A1* | 10/2015 | Graham, III | H04L 63/08 713/171 |
| 2016/0275303 A1 | 9/2016 | Narayanaswamy et al. | |
| 2016/0359684 A1 | 12/2016 | Rizqi et al. | |
| 2017/0223022 A1* | 8/2017 | Peterson | G06F 21/60 |
| 2018/0048464 A1 | 2/2018 | Lim et al. | |
| 2018/0287982 A1 | 10/2018 | Draeger et al. | |

OTHER PUBLICATIONS

"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

EP Application No. 19213366.8 European Search Report dated Mar. 19, 2020.

WIPO Application No. PCT/US2019/035870, International Search Report and Written Opinion of the International Searching Authority, dated Sep. 20, 2019.

* cited by examiner

ENCRYPTION KEY MANAGEMENT FOR AN AUTOMATED WORKFLOW

TECHNICAL FIELD

Embodiments of the invention relate to encryption key management. More specifically, embodiments of the invention relate to encryption key management for an automated workflow within a group-based communication system.

Traditionally, encryption for communication systems is carried out using end-to-end encryption techniques. These end-to-end encryption techniques ensure that only the sender and recipient (or recipients) of a message are privy to the contents of the message. However, as a result of this level of security, end-to-end encryption rules out server-bases functionality such as message search, file sharing, and granular user access controls when implemented within a group-based communication system. Another issue with existing encryption techniques in group-based communication systems is all-or-nothing permission restrictions. Here, permission to access files, messages, and other information cannot be allocated granularly and can be either totally revoked or totally open. Thus, when access is restricted server-based functionality is sacrificed and when access is open security risks may be present.

Accordingly, existing encryption techniques are not suited for advanced features such as automated workflows that perform a series of steps in response to a trigger condition. As such, what is needed is an encryption key management system and method that integrates encryption key management into an automated workflow within a group-based communication system allowing for granular revocation of access while maintaining features and performance, such that user experience is not compromised.

SUMMARY

Embodiments of the invention solve the above-mentioned problems by providing a system and method for providing encryption key management to an automated workflow within a group-based communication system. In some embodiments, the system and method provide granular control over access to the contents of the group-based communication system including the automated workflow. Thus, embodiments of the invention provide encryption key management to the automated workflow while maintaining features and without compromising user experience.

A first embodiment of the invention is directed to one or more non-transitory computer-readable media storing computer-executable instructions that, when executed by a processor, perform a method for providing encryption key management to an automated workflow within a group-based communication system, the method comprising the steps of responsive to determining that a trigger condition associated with the automated workflow has been satisfied, retrieving an organization-specific decryption key from a key server, retrieving, from a data store, an encrypted workflow associated with the automated workflow, automatically decrypting the encrypted workflow using the organization-specific decryption key to obtain a decrypted automated workflow automatically initiating the decrypted automated workflow to perform at least one interaction with a user, wherein the at least one interaction with the user includes at least one of creating a form to be completed by the user and sending a message to the user, receiving user input associated with the automated workflow, generating a workflow response based on the user input, encrypting, using an organization-specific encryption key, the workflow response, and storing the encrypted workflow response in the data store.

A second embodiment of the invention is directed to an encryption key management system for providing encryption key management to an automated workflow within a group-based communication system comprising a data store, a key server, and a processor programmed to perform a method for providing encryption key management to an automated workflow within a group-based communication system, the method comprising the steps of responsive to determining that a trigger condition associated with the automated workflow has been satisfied, retrieving an organization-specific decryption key from the key server, retrieving, from the data store, an encrypted workflow associated with the automated workflow, automatically decrypting the encrypted workflow using the organization-specific decryption key to obtain a decrypted automated workflow, automatically initiating the decrypted automated workflow to perform at least one interaction with a user, wherein the at least one interaction with the user includes at least one of creating a form to be completed by the user and sending a message to the user, receiving user input associated with the automated workflow, generating a workflow response based on the user input, encrypting, using an organization-specific encryption key, the workflow response, and storing the encrypted workflow response in the data store.

A third embodiment of the invention is directed to a method for providing encryption key management to an automated workflow within a group-based communication system, the method comprising the steps of responsive to determining that a trigger condition associated with the automated workflow has been satisfied, retrieving an organization-specific decryption key from the key server, retrieving, from the data store, an encrypted workflow associated with the automated workflow, automatically decrypting the encrypted workflow using the organization-specific decryption key to obtain a decrypted automated workflow, automatically initiating the decrypted automated workflow to perform at least one interaction with a user, wherein the at least one interaction with the user includes at least one of creating a form to be completed by the user and sending a message to the user, receiving user input associated with the automated workflow, generating a workflow response based on the user input, encrypting, using an organization-specific encryption key, the workflow response, and storing the encrypted workflow response in the data store.

Additional embodiments of the invention are directed to a method for granularly restricting user access within a group-based communication system comprising an automated workflow, wherein the automated workflow comprises at least one step performed in response determining that a trigger condition has been met.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
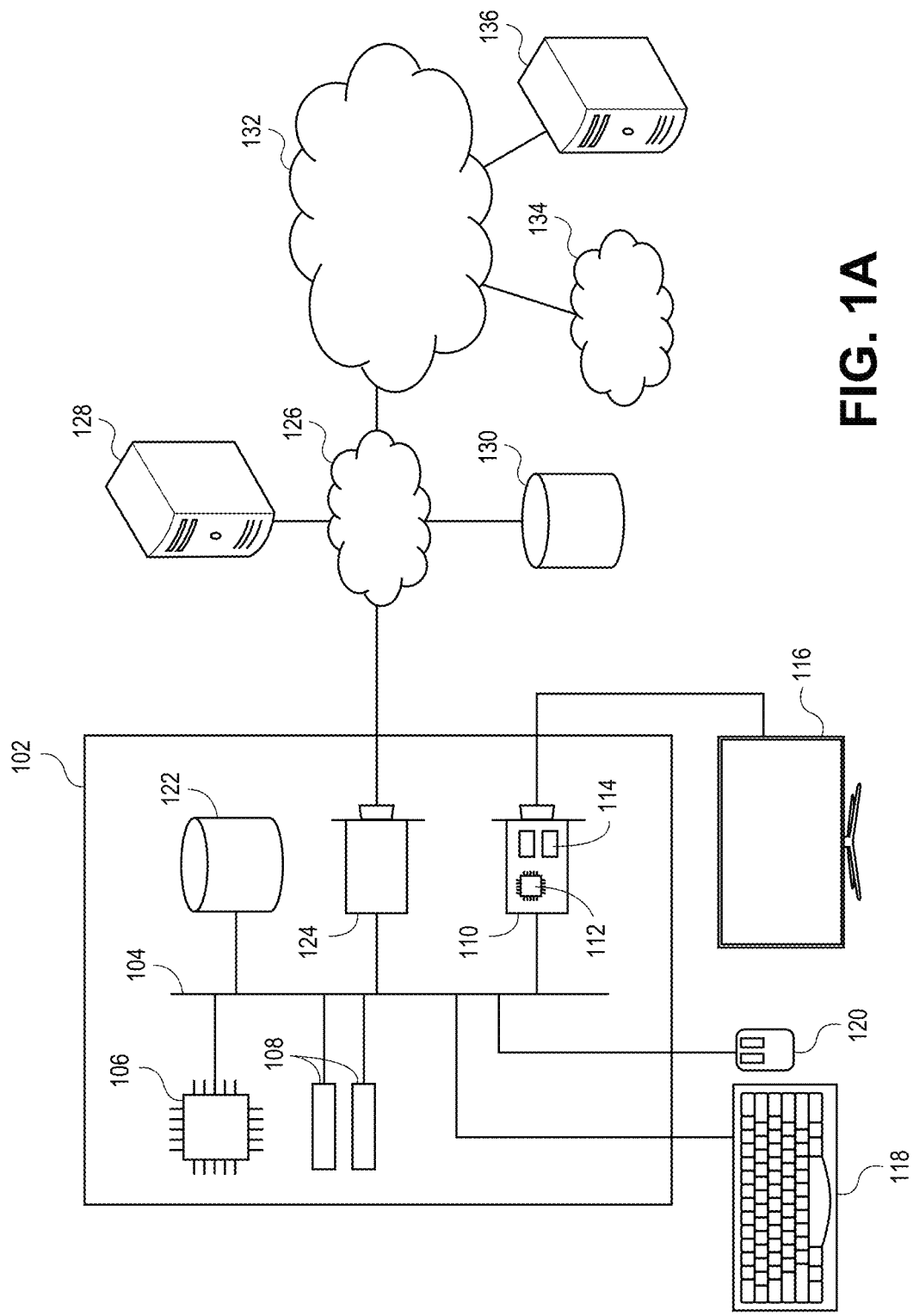
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
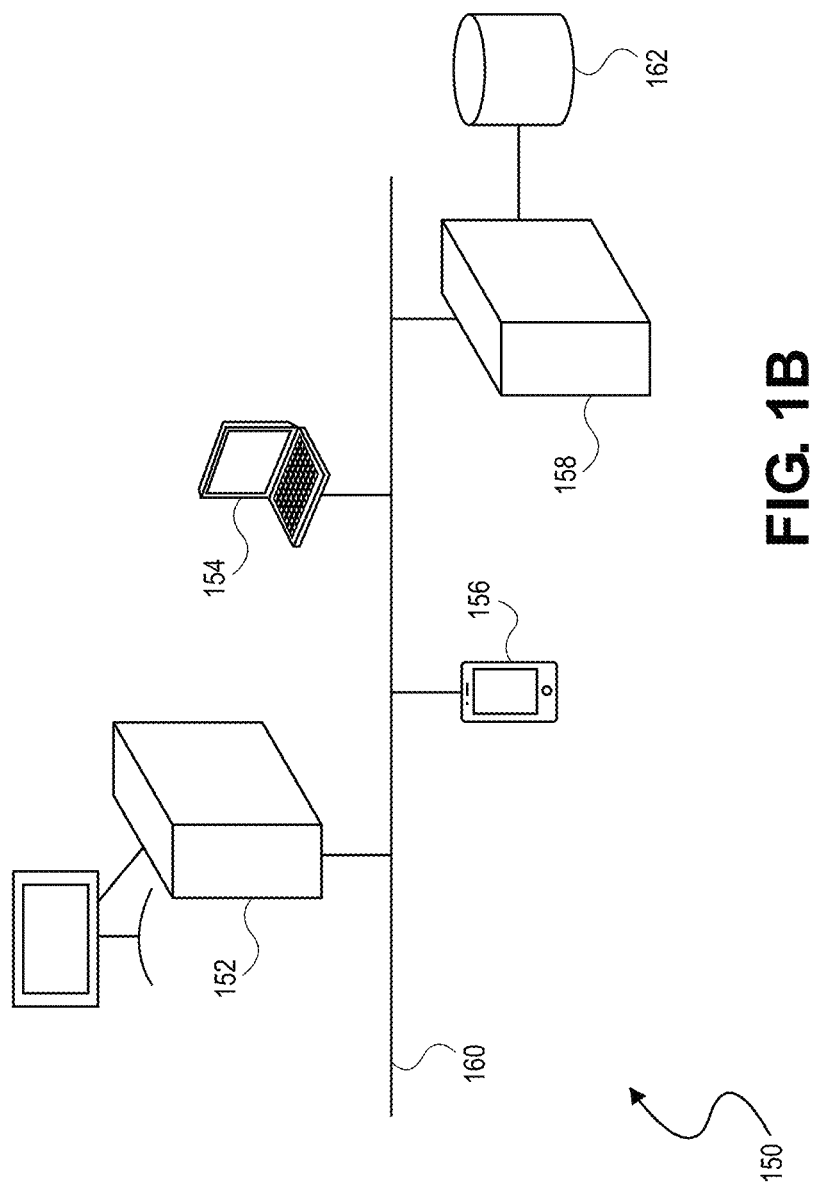
FIG. 1B depicts an exemplary diagram illustrating components of a system for carrying out embodiments of the invention.

Turning now to FIG. 1B, a system figure illustrating elements of a system 150 for carrying out embodiments of the invention is depicted. The system 150 comprises any number of client devices, such as client device 152, client device 154, and client device 156. As depicted in FIG. 1B, client devices may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communications system hosted on the same server as a competitor's group-based communication system for security reasons. Group-based communication server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system is contemplated. Group-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. Wherein each user may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within the channel have access to messages and files posted within the channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the functions described herein with respect to a processor may be carried out by the processors within any of these devices. In some embodiments, for example, a processor within the group-based communication system server may perform a first function, while a processor within the client device performs a second function.

Figure 2:
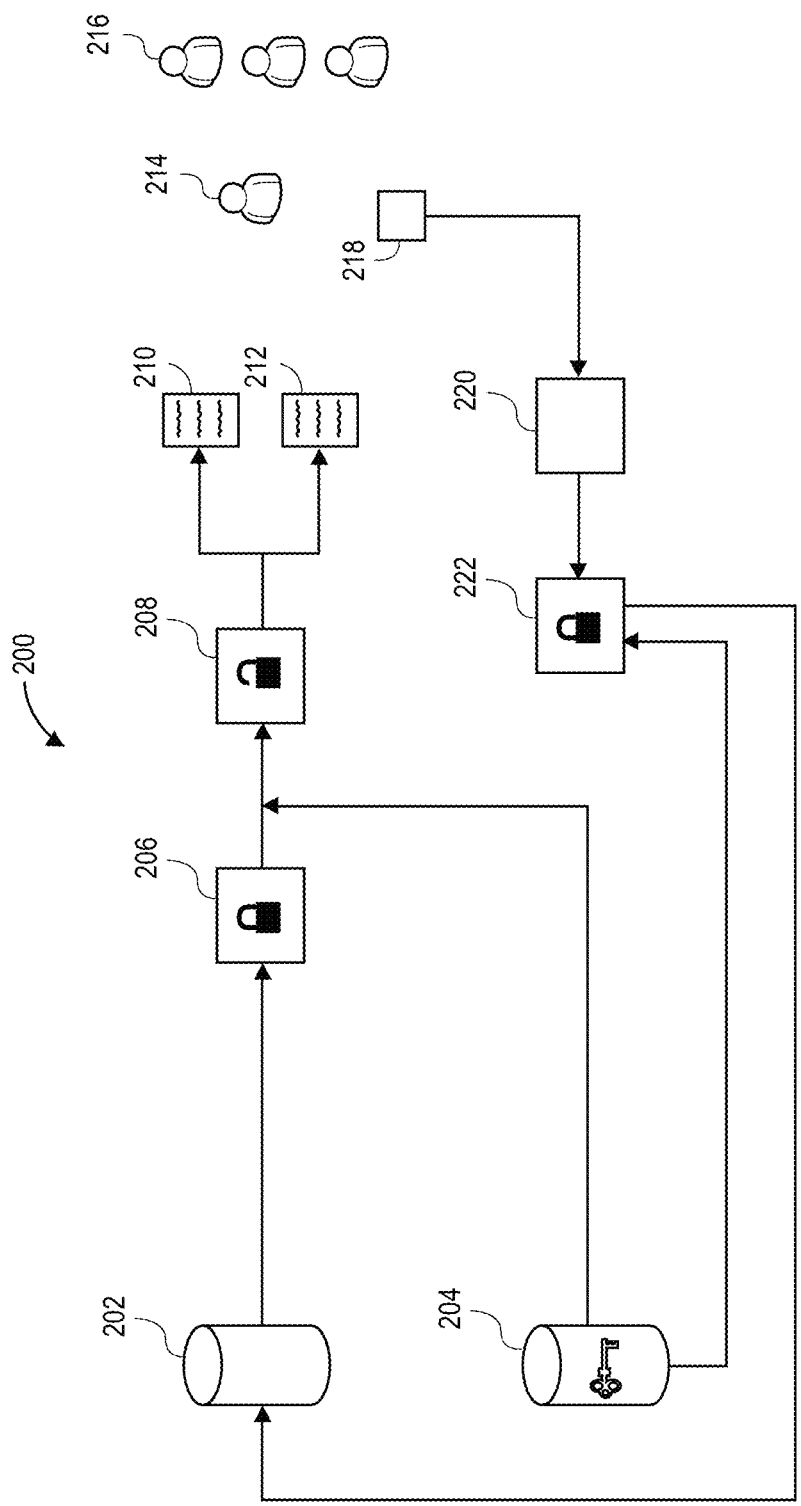
FIG. 2 depicts an exemplary encryption key management system for some embodiments of the invention.

Turning now to FIG. 2, an exemplary encryption key management system 200 is depicted. In various embodiments, the encryption key management system 200 provides encryption key management to data communicated over the group-based communication system. The encryption key management system 200 comprises an encrypted data store 202 and a key server 204. In some embodiments, at least one of the encrypted data store 202 and the key server 204 may be stored on the group-based communication system data store. The encrypted data store 202 stores a plurality of encrypted data structures encrypted with various encryption keys, such as an encrypted workflow 206 comprising ciphertext. The key server 204 stores encryption keys and decryption keys corresponding to various data structures within the encrypted data store 202. For example, the key server 204 may store an encryption key associated with the encrypted workflow 206 and a decryption key operable to decrypt the ciphertext of the encrypted workflow 206 to produce a decrypted workflow 208 comprising plaintext.

The decrypted workflow 208 is operable to respond to a trigger condition by instructing the processor to perform a step or a series of steps. In some embodiments, at least one of the steps may be comprise interaction with a user 214 via the group-based communication system. The interaction with the user may comprise at least one of creating a form 210 to be completed by the user and sending a message 212 to the user. In some embodiments, the decrypted workflow 208 instructs interaction with a plurality of users 216 simultaneously. For example, the user interaction, in some embodiments, may comprise any of sending a decrypted workflow 208 to a plurality of users, sending a form to a plurality of users, sending a plurality of forms to a single user, and sending a plurality of decrypted workflow 208s to a single user.

A user input 218 is received via the group-based communication system from the user. In response to receiving the user input 218, a workflow response 220 is generated based on the user input 218. The workflow response 220 is encrypted using an encryption key generated by the key server 204 specifically for the workflow response 220 to produce an encrypted workflow response 222. The encryption key may be an organization-specific encryption key associated with an organization that uses the group-based communication system and owns the workflow. The encrypted workflow response 222 is stored in the encrypted data store 202 along with the encrypted workflow 206.

In a case where the decrypted workflow 208 is edited, the decrypted workflow 208 may be any of saved, published, and re-encrypted. The re-encrypted workflow is stored in the encrypted data store 202. Here, the re-encrypted workflow may be saved over the previous encrypted workflow 206, such that the original encrypted workflow 206 is overwritten or saved as an additional separate encrypted workflow. For example, when a user has changed the trigger condition of the automated workflow or edited the steps of the automated workflow, the automated workflow may be re-encrypted and stored in the encrypted data store 202, as discussed above. As described herein, the workflow or automated workflow refers to an automated sequence of steps responsive to a trigger condition within the group-based communication system.

Figure 3:
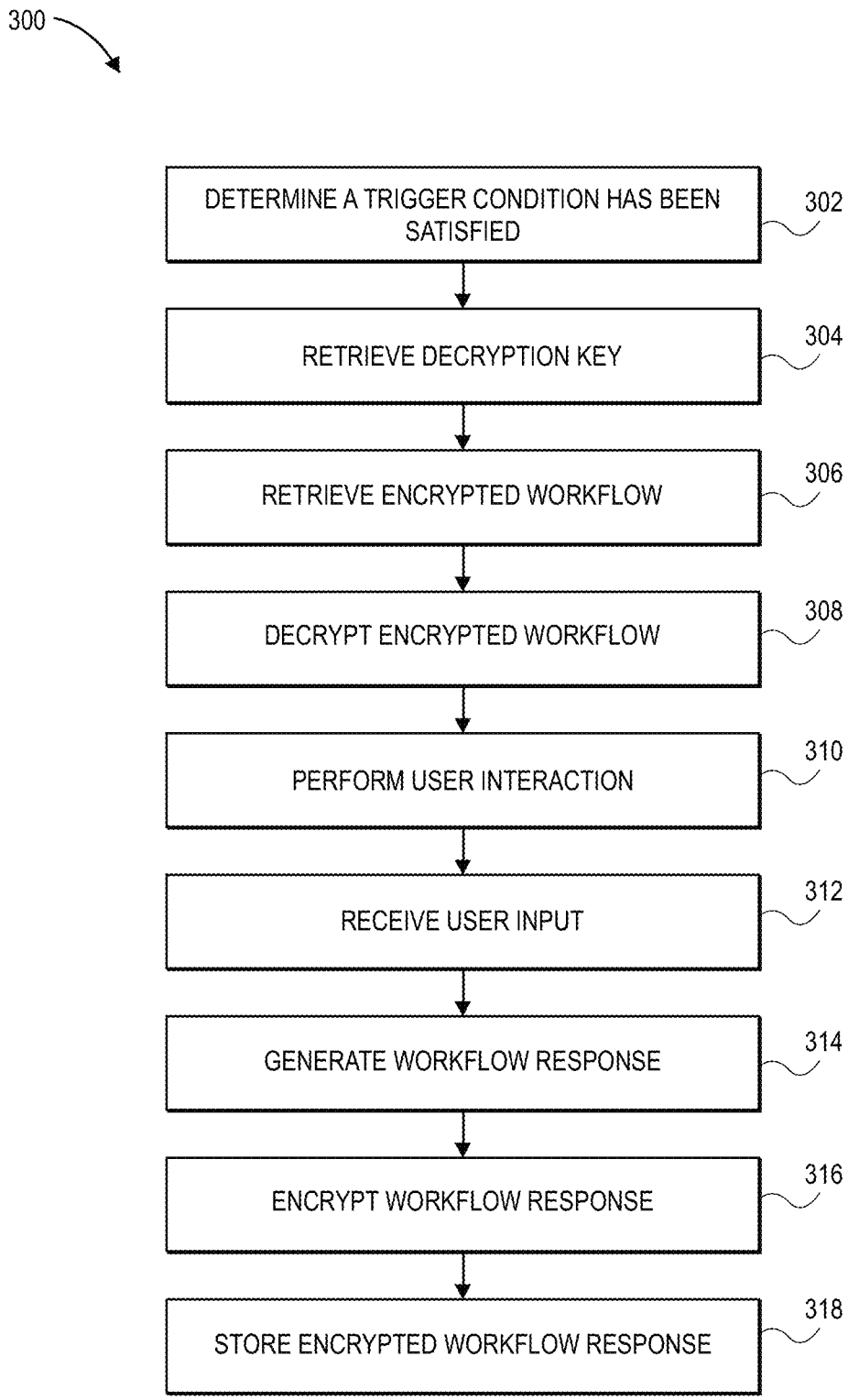
FIG. 3 depicts a flowchart illustrating a method for providing encryption key management to an automated workflow.

Turning now to FIG. 3, a method 300 comprising steps for providing encryption key management to the automated workflow of the group-based communication system is shown. In some embodiments, the method 300 is carried out by a processor executing computer-readable instructions. Therefore it should be understood that the method may be carried out by any of the devices described herein as comprising a processor. In certain embodiments, the steps may be carried out by multiple processors, such that a first processor performs a first portion of the steps and a second processor performs a second portion of the steps. The steps of the method 300 are discussed in detail below.

At step 302, it is determined that a trigger condition has been satisfied. The trigger condition may be based on at least one of a message post to a group in the group-based communication system, a user selection, an addition of a new user, a user reaction, a predefined time-based trigger, and information from an external resource. The user selection, for example, may consist of the user selecting the automated workflow within the group-based communication system. Similarly, the addition of a new user may consist of a first-time user joining the group-based communication system or an existing user being added to a channel within the group-based communication system, such that the user is new that particular channel. The user reaction as described herein, may be, for example, a reaction by the user to a particular decrypted workflow 208 within the group-based communication system, such as an emoji or reactji.

In some embodiments, the predefined time-based trigger is a user-scheduled trigger. For example, the user may schedule the automated workflow to trigger at a specific date and time, as defined by a user input 218 into the group-based communication system. In one example, the automated workflow may be associated with a weekly recurring meeting between the user and a plurality of the user's peers. Accordingly, if the meeting is scheduled for 10:00 AM every Monday, the user may set the automated workflow to trigger every Monday at 9:30 AM to remind the user's peers about the meeting with a decrypted workflow 208. In some embodiments, the information from the external resource may be for example, email information, calendar information, and other user information. Further, in some embodiments, the external resource is any source of data external to the group-based communication system, such as, for example, an external database that communicates with the group-based communication system via the network 160.

At step 304, the decryption key is retrieved from the key server 204. This particular step may involve submitting a key request to the key server 204. Here, the key request may comprise authentication data authenticating the user of the group-based communication system, as well as data relating to the automated workflow, such as metadata that identifies the specific automated workflow among a plurality of automated workflows. Thus, the key server 204 can provide the correct decryption key to the user according to the specific workflow that is being requested.

In some embodiments, only users that have been granted access are permitted to obtain the decryption key. For example, for a given automated workflow, the creator of the automated workflow can select users that should have access to the automated workflow. Thus, only users that are authenticated and have been granted access can receive the decryption key. Alternatively, access to the decryption key may be determined based on a location of the automated workflow within the group-based communication system. For example, if an automated workflow is shared within a specific channel of the group-based communication system, all users within that specific channel may be permitted access to the decryption key. In some embodiments, the decryption key is an organization-specific decryption key meaning that the decryption key follows an encryption key management policy pertaining to a specific organization. For example, a first organization encryption key management policy may require key rotation be carried out periodically, while a second organization encryption key management policy does not require key rotation. Further, a third organization may opt out of encryption key management entirely, such that the automated workflow need not be encrypted. Here, the third organization may be a low-security, low-risk business. However, for many organizations especially those having high-risk data and major security concerns, it may be desirable that data is protected by encryption.

Key rotation as described herein refers to the automatic or manual rotation of encryption keys and decryption keys. Although this disclosure refers to separate encryption keys and decryption keys for the sake of clarity, some embodiments may employ symmetric encryption where the encryption key is the same as the decryption key. Other embodiments may employ asymmetric encryption to encrypt and decrypt a symmetric encryption key (used to encrypt and decrypt the actual data) using separate encryption keys and decryption keys. In various embodiments, key rotation may be carried out by the processor within either of the key server 204 and the encrypted data store 202 or within both the key server 204 and the data store 202 simultaneously. In some embodiments, key rotation comprises periodically replacing an organization-specific encryption key or decryption key with a new organization-specific encryption key or decryption key based on an organization-specific policy set by each organization. For example, a security-conscious organization may increase a rate that key rotation is carried out, such that encryption keys and decryption keys are replaced more often. In some embodiments, the automated workflow may follow the organization-specific policy of the organization to which the automated workflow belongs. For example, if a first organization creates an automated workflow within a shared channel between the first organization and a second organization, the automated workflow will follow the first organization's policy. For example, key rotation will be carried out for the automated workflow according to the first organization's policy.

At step 306, the encrypted workflow 206 is retrieved from the encrypted data store 202. Here, a request is submitted to the encrypted data store 202 for a particular workflow, such that the encrypted data store 202 can identify the encrypted workflow 206 based on encrypted workflow metadata and provide the correct encrypted workflow 206. At step 308, after the decryption key and encrypted workflow 206 have been retrieved, the encrypted workflow 206 is decrypted using the decryption key to convert ciphertext of the encrypted workflow 206 into plaintext to obtain the decrypted workflow 208. At step 310, after the decrypted workflow 208 has been obtained, the decrypted workflow 208 is initiated to perform at least one step. In some embodiments, a series of steps may be performed. The step may comprise at least one user interaction, such as creating a form to be completed by the user and sending a decrypted workflow 208 to the user.

Next, at step 312, user input 218 is received. The user input 218 may include, for example, a reply to the message and/or submitting the completed form. At step 314, workflow response 220 comprising plaintext is generated based on the user input 218. Accordingly, the workflow response 220 may comprise data relating to the user response. For example, if the user input 218 was a reply to the message, the text from the reply may be saved as part of the workflow response plaintext. Alternatively, if the user input 218 was a submission of the completed form, text associated with the completed form may be saved as part of the workflow response plaintext. In some embodiments, the workflow response 220 may comprise a spreadsheet or table of data, which may be plaintext. The spreadsheet may consist of data such as user information or organization-specific information. For example, the spreadsheet may comprise information such as, usernames, timestamps, questions, and answers. In some embodiments, the spreadsheet is sortable by at least one of usernames, timestamps, questions, and answers. Accordingly, a user or administrator can easily access and sort the information on the spreadsheet according to their preference.

At step 316, after the workflow response 220 has been generated, the workflow response 220 is encrypted using an encryption key provided by the key server 204. The encryption process converts the workflow response 220 plaintext into an encrypted workflow response 222 comprising ciphertext encrypted using the encryption key. After encryption, at step 318, the encrypted workflow response 222 is stored in the encrypted data store 202. In some embodiments, the encrypted workflow response 222 may further comprise metadata, such that the encrypted workflow 206 can be identified within the encrypted data store 202 for later retrieval.

It should be understood that the encryption process discussed above is not limited to encrypting the workflow response 220. For example, other data structures may be encrypted such as the automated workflow. In some embodiments, the automated workflow or a portion of the automated workflow may be encrypted using an encryption key from the key server 204 to generate the encrypted workflow 206. The encrypted workflow 206 may then be stored in the encrypted data store 202.

It should also be understood that any of the functions described above may be carried out automatically without user interaction, such as by the processor. For example, the encrypted workflow 206 may be automatically decrypted by the processor using the decryption key. Also, retrieval of the decryption key and the encrypted workflow 206 may be carried out automatically. Further, the user interaction of the automated workflow may be initiated automatically. In some embodiments, the automated workflow comprises computer-executable instructions that instruct the processor to perform a series of steps including the at least one user interaction.

In some embodiments, after the user interaction at step 310 has been performed, the decrypted workflow 208 may be re-encrypted using an additional encryption key. This may be the case where, for example, the workflow itself has changed as a result of the user interaction. In some embodiments, the additional encryption key may be different than an original encryption key used to encrypt the encrypted workflow 206 for security purposes. In some embodiments, re-encryption of the automated workflow may be carried in response to user interaction, editing of the automated workflow, publishing of the automated workflow, or any other change to the automated workflow to enhance security. Re-encryption of the decrypted workflow produces a re-encrypted workflow comprising ciphertext which is stored in the encrypted data store 202.

Figure 4:
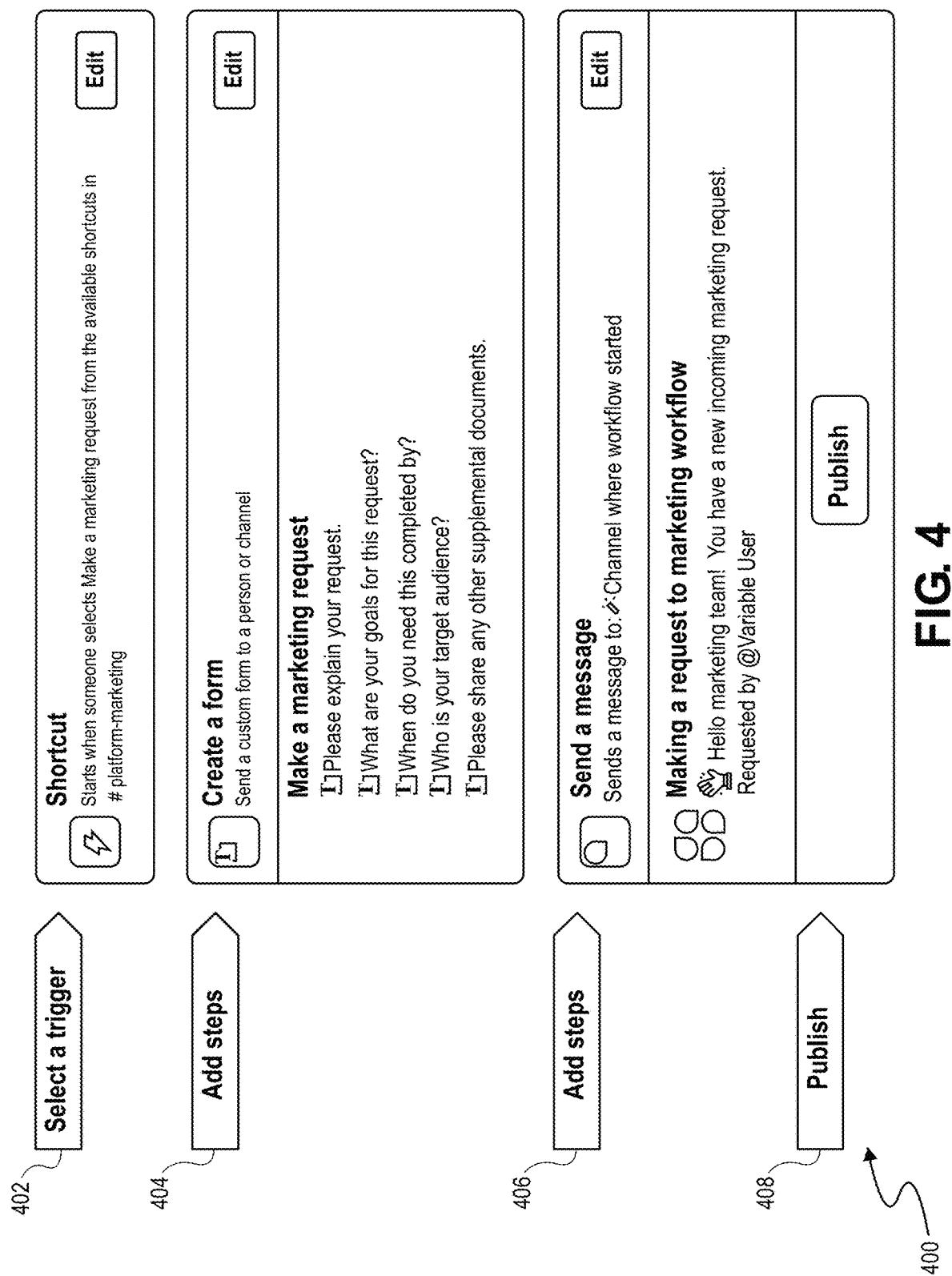
FIG. 4 depicts an exemplary screenshot of automated workflow setup within a group-based communication system for some embodiments of the invention.

Turning now to FIG. 4, an exemplary screenshot 400 from the group-based communication system is depicted showing setup of an exemplary automated workflow. As shown, when setting up the automated workflow, the user is presented a plurality of option selections. It should be understood that a view, similar to as shown in the screenshot, may be presented to the user via a user display, such as display 116. The user is presented with a select a trigger option 402 to edit a trigger selection to define the trigger condition for which the automated workflow steps will be carried out. It should be understood that, in some embodiments, multiple trigger conditions may be selected such that the automated workflow will be initiated when one or more of the trigger conditions are satisfied. Alternatively, embodiments are contemplated in which the workflow is only initiated when all trigger conditions are satisfied according to the user selection.

The user is also presented with at least one add steps option, such as add steps option 404 and add steps option 406. In some embodiments, add steps option 404 comprises a form creation engine for the user to specify details relating to a form request such as, a summary of the form, a goal of the form, a deadline, a target audience, and a request to share supplemental documents relating to the form request, as shown.

The exemplary screenshot 400 also presents the user with a publish option 408. In some embodiments, the publish option 408 may be a button that the user can press to submit and publish the workflow. By publishing the workflow, the user can share the workflow with another user, a plurality of users, or within a channel of the group-based communication system, such that the workflow is available for use by other users. For example, one the workflow is published, other users may complete forms associated with the workflow, respond to questions associated with the workflow, upload documents relevant to the workflow, or interact with the workflow in any way now known or later developed. Upon publishing the workflow, the workflow may be encrypted using the encryption process as described above, and saved in the encrypted data store 202.

Continuing the weekly recurring meeting example from above, the user may create an automated workflow for the meeting. Upon initiating creation of the automated workflow the user may be presented with options similar to the exemplary screenshot 400 comprising a select a trigger option 402, a first add step option 404, a second add step option 406, and a publish option 408. The user may use the select a trigger option 402 to define a time-based trigger such that the automated workflow is triggered every Monday at 9:30 AM. In the example, the user may also use the first add step option 404 to create a step within the automated workflow for sending a form to a group within the group-based communication system. The form may comprise a meeting invitation by which users are tasked with either accepting or declining the meeting. The second add step option 406 may be used by the user to set a message for sending within the group-based communication system, such as a message reminding other users of the 10:00 AM meeting.

The publish option 408 may be selected by the user to submit the automated workflow. It should be understood that, in some embodiments, the automated workflow is not active until the automated workflow has been published. Further, it should be understood that the automated workflow may be edited further after publishing and then republished to update the automated workflow. For example, if the user incorrectly entered the time of the recurring meeting as 11:00 AM the user could edit the automated workflow to change the time to 10:00 AM then republish the automated workflow using the publish option 408.

Figure 5:
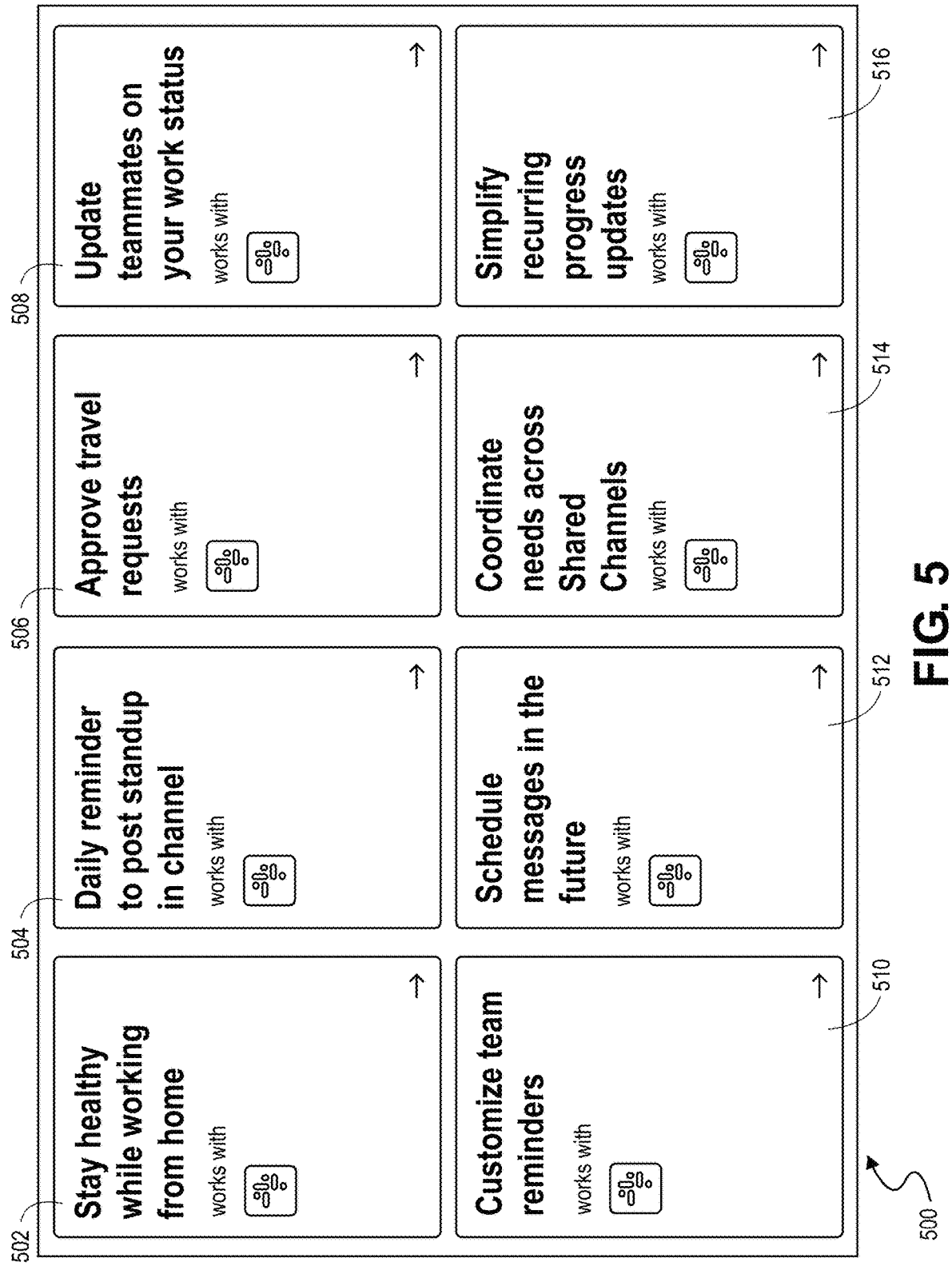
FIG. 5 depicts an exemplary screenshot of workflow templates within the group-based communication system for some embodiments of the invention.

Turning now to FIG. 5, an exemplary screenshot 500 from the group-based communication system is depicted showing a set of workflow templates. As shown in FIG. 5, workflows may be created according to a preexisting workflow template to reduce the workload on the user when setting up an automated workflow. Here, the user may select between a plurality of existing workflow templates in which a portion of the automated workflow is already established. As can be seen in FIG. 5, the exemplary screenshot includes a plurality of example workflow templates with a first workflow template 502 titled "Stay healthy while working from home." Such a workflow template may comprise a reminder for users of the group-based communication system to practice healthy work habits, such as stretching and good posture. A second workflow template 504 titled "Daily reminder to post standup in channel" could be used to remind a user daily to post in a channel within the group-based communication system. A third workflow template 506 titled "Approve travel requests" could be used to remind an administrator to approve a series of business-related travel requests. Here, the travel requests may be sent to the administrator by the automated workflow as a form to be filled-out by the administrator. A fourth workflow template 508 titled "Update teammates on your work status" may be included to request a status update from a user within the group-based communication system. The status update may be used to notify coworkers of the availability of that particular user. For example, a user may set their work status to Home Sick when the user is away from the office due to an illness.

A fifth workflow template 510 titled "Customize team reminders" may be included to set reminders to be sent to an entire channel within the group-based communication system. Here, the channel may include users working on a particular project and the reminders may include information about project deadlines and meetings. A sixth workflow template 512 titled "Schedule messages in the future" may be included to send a message to another user within the group-based communication system. For example, the sixth workflow template 512 may be used by a user who prepares a message to be sent to another user that is away on vacation. It may not be desirable to send the message while the user is away so the user may schedule the message to be sent when the other user returns from vacation. Here, the workflow may be triggered based at least in part on the work status of the user relating to the user's availability.

A seventh workflow template 514 titled "Coordinate needs across Shared Channels" may be used to setup a workflow that requests needs from users within shared channels of the group-based communication system. Here, shared channels may be channels within the group-based communication system that are shared between one or more organizations. The request may be sent to each user as a form for the user to fill out specific needs. Finally, an eighth workflow template 516 titled "Simplify recurring progress updates" may be used to request and share progress updates. For example, the eighth workflow template 516 may be used to request a progress update from a user in charge of a specific project, then share the progress update with other users working on the project.

It should be understood that the workflow templates are not limited to the functions discussed above and may be customized to provide common use functionality. Further, in some embodiments the workflow templates can be created based on previous automated workflows created by users. For example, continuing the recurring meeting example discussed above, the user may wish to establish a second weekly meeting at the end of the week on Friday at 10:00 AM. Here, the user may use the previous automated workflow for the Monday 10:00 AM meeting as a workflow template to create a new meeting reminder. The user may simply edit the weekly reminder day to Friday instead of Monday and publish the automated workflow as a new automated workflow for the Friday meeting.

Figure 6A:
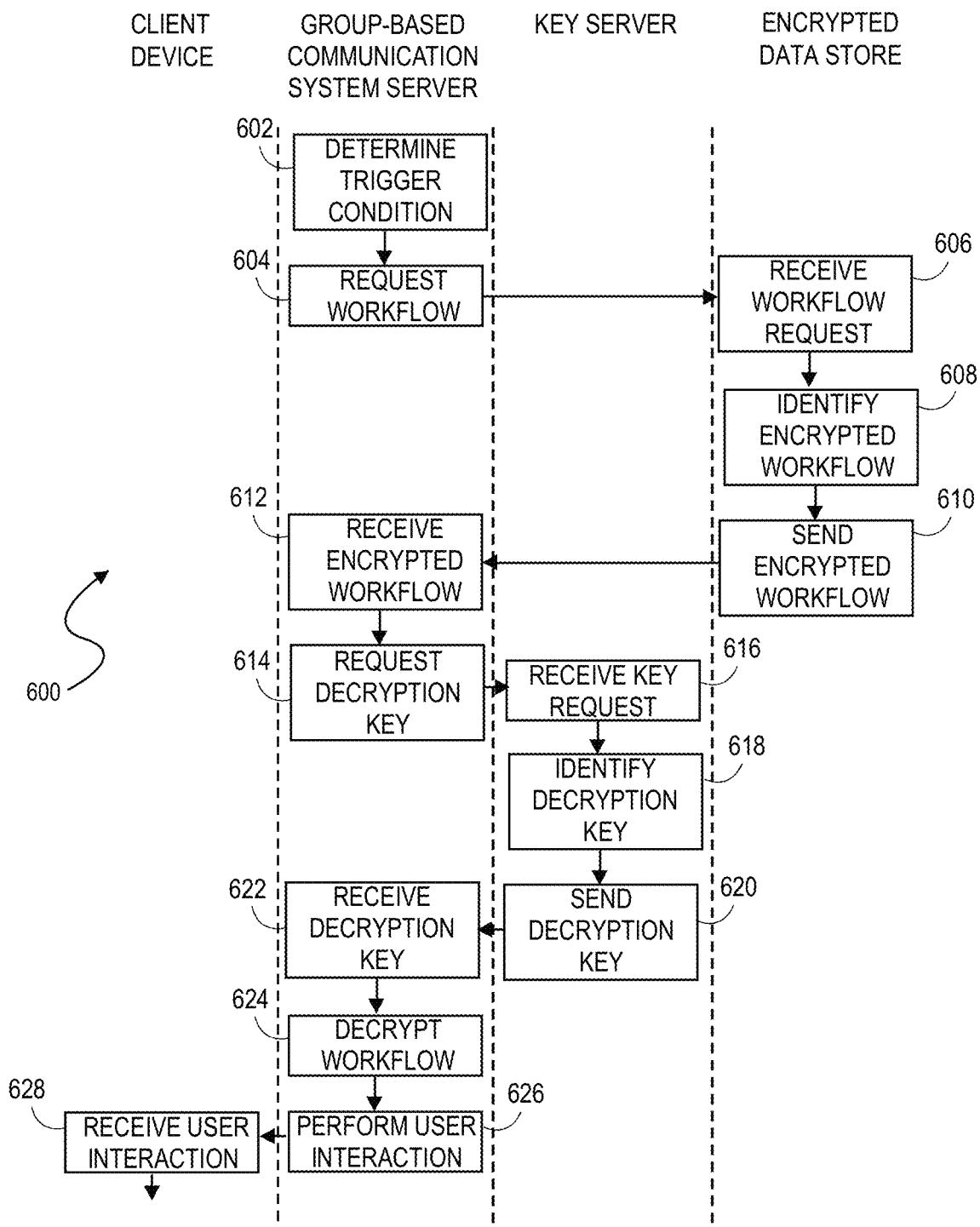
FIGS. 6A and 6B collectively depict a swim lane diagram illustrating the component responsibility flow of a process for providing encryption key management for an automated workflow.
Figure 6B:
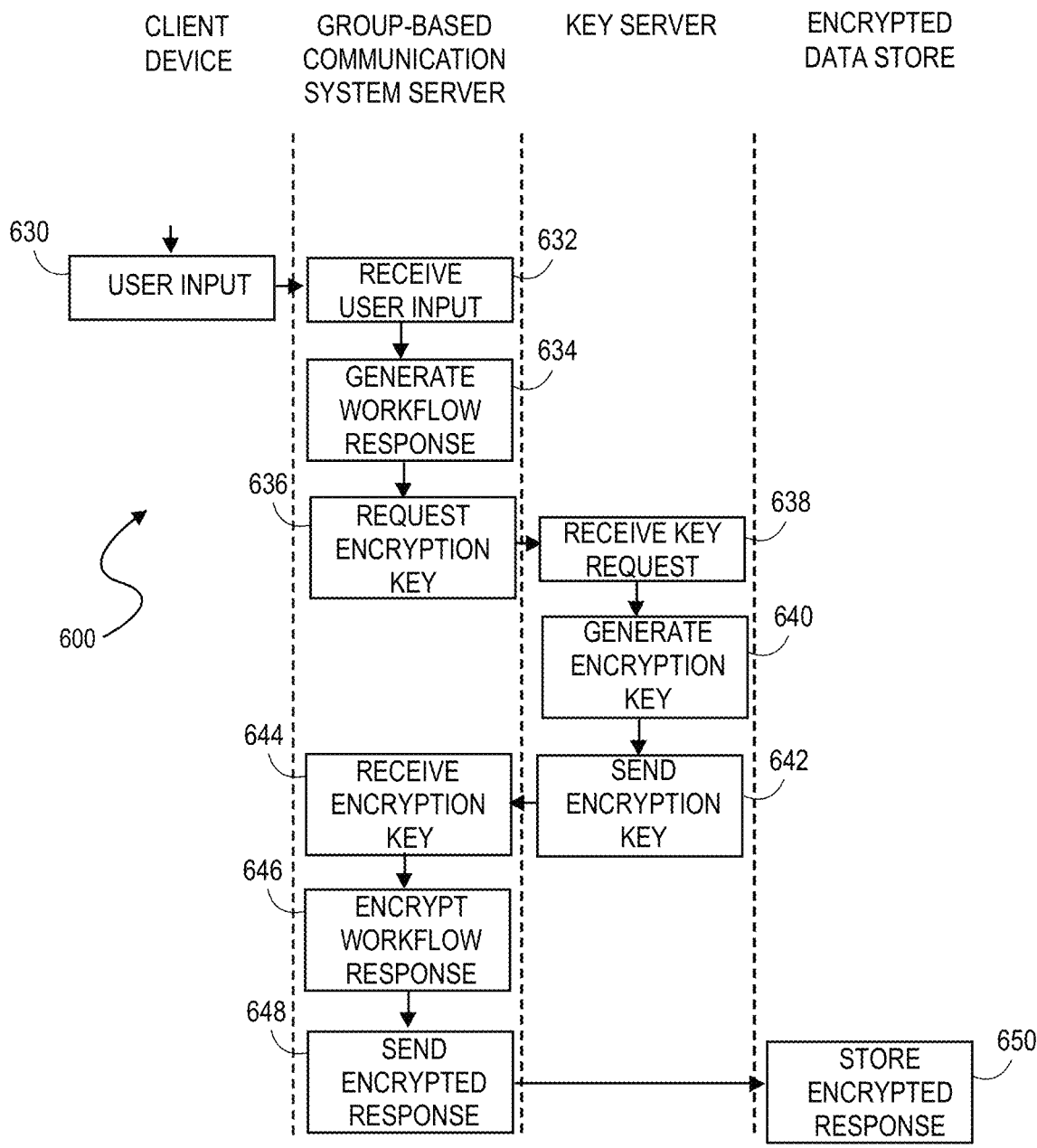

Turning now to FIGS. 6A and 6B together, a swim lane diagram illustrating the component responsibility flow of a process for providing encryption key management for the automated workflow in accordance with some embodiments of the invention, which is referred to generally by reference numeral 600. It should be understood that in some embodiments, the component responsibility described in reference to the process 600 may further be applied to the steps of method 300. Process 600 begins with the group-based communication server 158 at step 602 where, the group-based communication server 158 determines whether at least one trigger condition has been satisfied. Step 602 may involve monitoring multiple trigger conditions, as described above. Next, at step 602 the group-based communication server 158 requests the automated workflow in response to determining that the at least one trigger condition has been satisfied. The automated workflow may be requested from the encrypted data store 202 via communication means between the group-based communication server 158 and the encrypted data store 202, such as an Internet connection, a local-area network connection, or a direct connection.

At step 606 control then moves to the encrypted data store 202 which receives the automated workflow request from the group-based communication server 158. The automated workflow request may include a set of metadata associated with the particular automated workflow. Next at step 608 the encrypted data store identifies the encrypted workflow 206 associated with the automated workflow, which in some embodiments, may be accomplished using the set of metadata associated with the particular automated workflow, such that the particular encrypted workflow 206 may be identified out of a plurality of encrypted workflows. In such embodiments, each of the plurality of encrypted workflows may be associated with automated workflow-specific metadata, such that each encrypted workflow may be identified according to the respective automated workflow-specific metadata. At step 610, upon identifying the encrypted workflow 206, the encrypted data store 202 sends the encrypted workflow 206 to the group-based communication server 158.

Control then returns to the group-based communication server 158 at step 612. Here the group-based communication server 158 receives the encrypted workflow 206 sent from the encrypted data store. The encrypted workflow 206 comprises ciphertext which is unreadably by the group-based communication server 158 without being decrypted by the appropriate decryption key. At step 614, the group-based communication server 158 requests the decryption key from the key server 204 using any communication means described herein. In some embodiments, the appropriate decryption key may be identified by encryption metadata store with the encrypted workflow. In other embodiments, the system may be able to determine the appropriate decryption key based on the circumstances of the trigger condition (for example, the organization, channel, and time of the event that triggers the workflow).

Control then moves on to the key server 204 at step 616, where the key server 204 receives the decryption key request from the group-based communication server 158. Upon receiving the decryption key request, the key server 204 identifies the decryption key associated with the particular automated workflow at step 618. Next at step 620 the key server 204 sends the decryption key to the group-based communication server 158. In some embodiments, the key server 204 stores a plurality of encryption keys and decryption keys associated with a respective plurality of automated workflows.

Control again returns to the group-based communication server 158 at step 622, where the group-based communication server 158 receives the decryption key from the key server 204. Upon receiving the decryption key the group-based communication server 158, at step 624, decrypts the encrypted workflow 206 using the decryption key. Here, data from the decryption key is used to convert the ciphertext of the encrypted workflow 206 into plain text associated with the automated workflow. In some embodiments, the plaintext as described herein comprises some or all of readable text, text formatting, and computer readable instructions associated with performing a task.

Upon decrypting the encrypted workflow 206, the group-based communication server 158 performs at least one user interaction at step 626. In some embodiments, the user interaction is performed according to the plaintext of the automated workflow. For example, the computer readable instructions of the plaintext may instruct a processor associated with the group-based communication server 158 to perform the user interaction. The user interaction is performed via communication between the group-based communication server 158 and a client device, which may be any of client devices 152, 154, and 156.

Control is then shifted to the client device at step 628, where the user interaction is received by the client device from the group-based communication server 158. Upon receiving the user interaction the client device may request and receive at least one user input at step 630. The user input may be any user input described herein, such as a selection by a user, a reaction from the user, or a form filled out by the user. The user input is then sent to the group-based communication server 158.

Control is then shifted back to the group-based communication server 158 at step 632, where the group-based communication server 158 receives the at least one user input. Upon receiving the user input the group-based communication server 158 generates a workflow response 220 associated with the automated workflow and based on the received user input at step 634. In one embodiment, the user interaction is a request for a plurality of users to complete a form, the user input may be the completed form. In such an embodiment, the workflow response 220 may be a compilation of the data from the completed forms from each of the plurality of users into a spreadsheet. After generating the workflow response 220, the group-based communication server 158 requests an encryption key from the key server 204 at step 636. In embodiments using symmetric encryption, the encryption key may be the same as the decryption key retrieved at steps 614-622 and may still be stored in a key cache local to the group-based communication system server. In such embodiments, the appropriate key may be retrieved directly from the key cache if it is present, rather than re-fetching it from the key server.

Control then moves to the key server 204 at step 638, where the key server 204 receives the encryption key request. Upon receiving the encryption key request, the key server 204 generates (or retrieves) an encryption key at step 640. After the key is generated, the key server 204 sends the encryption key to the group-based communication server 158 at step 642. It should be understood that where an encryption key is generated, a corresponding decryption key may also be generated for later decryption of data that has been encrypted with the encryption key. At step 644 the encryption key is received by the group-based communication server 158, which then assumes control over the process 600. The group-based communication server 158 uses the received encryption key to encrypt the workflow response 220 at step 646. Here, plaintext of the workflow response 220 is converted to ciphertext using the encryption key to produce an encrypted workflow response 222 associated with the workflow response 220.

Continuing the example from above, in the embodiment where the workflow response 220 is a spreadsheet comprising user data from a plurality of completed forms, the spreadsheet is composed of plaintext including the user data. The plaintext is then converted to ciphertext which is unreadable, such that security of the user data within the spreadsheet is enhanced. Accordingly, if a hacker steals the encrypted workflow response 222, the hacker is prevented from accessing the user data because the hacker idoes not have access to the corresponding encryption key. Thus, the hacker cannot decipher the ciphertext of the encrypted workflow response 222.

At step 648, the group-based communication server 158 sends the encrypted workflow response 222 to the encrypted data store 202. Control is then shifted to the encrypted data store 202 at step 650 where the encrypted workflow response 222 is stored within the encrypted data store. In some embodiments, the ciphertext of the encrypted workflow response 222 may be saved within the encrypted data store along with metadata for identifying the encrypted workflow response 222.

It should be understood that some of the steps described for process 600 may be performed in varying order from how the steps are depicted in FIGS. 6A and 6B. For example, in some embodiments steps 604 and 614 are performed simultaneously or in reverse order, such that the decryption key is requested before the encrypted workflow is requested. Further, in some embodiments the steps of process 600 may be repeated for any number of automated workflow or repeated multiple times for a single automated workflow.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for providing encryption key management to an automated workflow within a group-based communication system, the method comprising the steps of:
   responsive to determining that a trigger condition associated with the automated workflow has been satisfied, retrieving an organization-specific decryption key from a key server;
   retrieving, from a data store, an encrypted workflow associated with the automated workflow;
   automatically decrypting the encrypted workflow using the organization-specific decryption key to obtain a decrypted automated workflow,
   wherein the group-based communication system comprises a plurality of group-based communication channels allowing channel members of each respective group-based communication channel to view and transmit communications;
   automatically initiating the decrypted automated workflow to perform at least one interaction with a user within one of the plurality of group-based communication channels,
   wherein the at least one interaction with the user includes at least one of creating a form to be completed by the user and sending a message to the user;
   receiving user input associated with the automated workflow;
   generating a workflow response based on the user input;
   encrypting, using an organization-specific encryption key, the workflow response; and
   storing the encrypted workflow response in the data store;
   re-encrypting the decrypted automated workflow to produce a re-encrypted automated workflow, and storing the re-encrypted automated workflow in the data store.

2. The media of claim 1, wherein the trigger condition is based on at least one of a user selection, an addition of a new user, a user reaction, a predefined time-based trigger, and information from an external source.

3. The media of claim 1, wherein the automated workflow is created by a workflow creator from a set of workflow templates.

4. The media of claim 1, wherein the at least one interaction with the user is configured by a workflow creator via the group-based communication system.

5. The media of claim 1, wherein the trigger condition is based on a user selection.

6. The media of claim 1, wherein the at least one interaction with the user comprises periodically generating a reminder for the user.

7. The media of claim 1, wherein the automated workflow comprises metadata that is not encrypted.

8. An encryption key management system for providing encryption key management to an automated workflow within a group-based communication system comprising:
   a data store;
   a key server; and
   a processor programmed to perform a method for providing encryption key management to the automated workflow within the group-based communication system, the method comprising the steps of:
   responsive to determining that a trigger condition associated with the automated workflow has been satisfied, retrieving an organization-specific decryption key from the key server;
   retrieving, from the data store, an encrypted workflow associated with the automated workflow;
   automatically decrypting the encrypted workflow using the organization-specific decryption key to obtain a decrypted automated workflow,
   wherein the group-based communication system comprises a plurality of group-based communication channels allowing channel members of each respective group-based communication channel to view and transmit communications;
   automatically initiating the decrypted automated workflow to perform at least one interaction with a user,
   wherein the at least one interaction with the user includes at least one of creating a form to be completed by the user and sending a message to the user;
   receiving user input associated with the automated workflow;
   generating a workflow response based on the user input;
   encrypting, using an organization-specific encryption key, the workflow response; and
   storing the encrypted workflow response in the data store;
   re-encrypting the decrypted automated workflow to produce a re-encrypted automated workflow, and storing the re-encrypted automated workflow in the data store.

9. The system of claim 8, wherein the automated workflow is created by a workflow creator from a set of workflow templates.

10. The system of claim 8, wherein the at least one interaction with the user is configured by a workflow creator via the group-based communication system.

11. The system of claim 8, wherein the group-based communication system comprises at least one shared channel between a first organization and a second organization.

12. The system of claim 8, wherein the message sent to the user comprises a reminder.

13. A method for providing encryption key management to an automated workflow within a group-based communication system, the method comprising the steps of:
   responsive to determining that a trigger condition associated with the automated workflow has been satisfied, retrieving an organization-specific decryption key from the key server;
   retrieving, from a data store, an encrypted workflow associated with the automated workflow;
   automatically decrypting the encrypted workflow using the organization-specific decryption key to obtain a decrypted automated workflow,
   wherein the group-based communication system comprises a plurality of group-based communication channels allowing channel members of each respective group-based communication channel to view and transmit communications;

automatically initiating the decrypted automated workflow to perform at least one interaction with a user,
wherein the at least one interaction with the user includes at least one of creating a form to be completed by the user and sending a message to the user;
receiving user input associated with the automated workflow;
generating a workflow response based on the user input;
encrypting, using an organization-specific encryption key, the workflow response; and
storing the encrypted workflow response in the data store;
re-encrypting the decrypted automated workflow to produce a re-encrypted automated workflow, and storing the re-encrypted automated workflow in the data store.

14. The method of claim 13, wherein the at least one user interaction further includes sending the message to a plurality of users.

15. The method of claim 13, further comprising the step of decrypting the workflow response using the organization-specific decryption key.

16. The method of claim 13, further comprising the step of periodically replacing the organization-specific encryption key with a new organization-specific encryption key.

17. The method of claim 13, wherein the organization-specific encryption key is the same as the organization-specific decryption key.

18. The method of claim 13, further comprising the step of publishing the automated workflow to be reusable upon receiving a publish input from the user.

19. The method of claim 13, wherein the automated workflow is created by a workflow creator from a set of workflow templates.

* * * * *